US008315325B2

(12) United States Patent
Lee et al.

(10) Patent No.: US 8,315,325 B2
(45) Date of Patent: Nov. 20, 2012

(54) METHOD FOR TRANSMITTING/RECEIVING MULTIPLE CODEWORD IN A MULTIPLE INPUT MULTIPLE OUTPUT COMMUNICATION SYSTEM

(75) Inventors: Moon Il Lee, Gyeonggi-do (KR); Bin Chul Ihm, Gyeonggi-do (KR); Hyun Soo Ko, Gyeonggi-do (KR); Jin Young Chun, Gyeonggi-do (KR); Wook Bong Lee, Gyeonggi-do (KR); Jae Hoon Chung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 300 days.

(21) Appl. No.: 12/676,110

(22) PCT Filed: Sep. 5, 2008

(86) PCT No.: PCT/KR2008/005245
§ 371 (c)(1),
(2), (4) Date: Mar. 2, 2010

(87) PCT Pub. No.: WO2009/031846
PCT Pub. Date: Mar. 12, 2009

(65) Prior Publication Data
US 2010/0183057 A1 Jul. 22, 2010

Related U.S. Application Data

(60) Provisional application No. 60/969,958, filed on Sep. 5, 2007, provisional application No. 60/978,137, filed on Oct. 8, 2007.

(30) Foreign Application Priority Data

Apr. 10, 2008 (KR) .................... 10-2008-0033328
Jul. 2, 2008 (KR) .................... 10-2008-0064120

(51) Int. Cl.
*H04B 7/02* (2006.01)
*H04L 1/02* (2006.01)
(52) U.S. Cl. ........................................ 375/267
(58) Field of Classification Search ............... 375/267
See application file for complete search history.

(56) References Cited

U.S. PATENT DOCUMENTS 6,934,320 B2    8/2005   Tujkovic et al.
(Continued)

FOREIGN PATENT DOCUMENTS

KR    10-2006-0097519    9/2006
(Continued)

OTHER PUBLICATIONS

Qualcomm Europe, "Description of Single and Multi Codeword Schemes with Precoding," R1-060457, 3GPP TSG-RAN WG1 #44, Feb. 2006, XP-050101397.
Qualcomm Europe, "Further Link Analysis Comparing Layer Permutation with No Layer Permutation for 4×4," R1-063436, 3GPP TSG-RAN WG1 #47, Nov. 2006, XP-050103873.
(Continued)

*Primary Examiner* — David C. Payne
*Assistant Examiner* — Tanmay Shah
(74) *Attorney, Agent, or Firm* — Lee, Hong, Degerman, Kang & Waimey

(57) ABSTRACT

A method for transmitting a multiple codeword (MCW) in a Multiple Input Multiple Output (MIMO) communication system is disclosed. A method for transmitting a multiple codeword (MCW) in a Multiple-Input Multiple-Output (MIMO) communication system includes performing a channel coding and modulation process for each codeword of the multiple codeword (MCW), multiplying the channel-coded-modulated result by a rotation matrix decided by either a spatial multiplexing rate or a layer (R), and performing a codeword permutation (CP) on the multiple codeword (MCW), performing a MIMO encoding on the multiple codeword (MCW), and transmitting the multiple codeword (MCW) via a multi-antenna.

12 Claims, 6 Drawing Sheets

U.S. PATENT DOCUMENTS

| | | | |
|---|---|---|---|
| 7,016,658 B2 | 3/2006 | Kim et al. | |
| 2008/0013610 A1* | 1/2008 | Varadarajan et al. | 375/221 |
| 2008/0187058 A1* | 8/2008 | Sipila | 375/260 |

FOREIGN PATENT DOCUMENTS

| | | |
|---|---|---|
| WO | 2008/056928 | 5/2008 |

OTHER PUBLICATIONS

NTT DoCoMo, "Multi-Codebook Pre-coding Scheme for MIMO in E-UTRA Downlink," R1-070094, 3GPP TSG-RAN WG1 #47bis, Jan. 2007, XP-050104146.

* cited by examiner

METHOD FOR TRANSMITTING/RECEIVING MULTIPLE CODEWORD IN A MULTIPLE INPUT MULTIPLE OUTPUT COMMUNICATION SYSTEM

CROSS-REFERENCE TO RELATED APPLICATIONS

This application is the National Stage filing under 35 U.S.C. §371 of International Application No. PCT/KR2008/005245, filed on Sep. 5, 2008, which claims the benefit of earlier filing date and right of priority to Korean Application Nos. 10-2008-0033328, filed on Apr. 10, 2008 and 10-2008-0064120, filed on Jul. 2, 2008, and also claims the benefit of U.S. Provisional Application Ser. Nos. 60/969,958, filed on Sep. 5, 2007, and 60/978,137, filed on Oct. 8, 2007.

TECHNICAL FIELD

The present invention relates to a Multiple Input Multiple Output (MIMO) communication system, and more particularly to a method for transmitting/receiving a multiple codeword in a MIMO communication system.

BACKGROUND ART

In recent times, with the increasing development of information communication technologies, a variety of multimedia services, and a variety of high-quality services have been developed and introduced to the market, so that demands of wireless communication services are rapidly increasing throughout the world. In order to actively cope with the increasing demands, capacity of a communication system must be increased. A variety of methods for increasing communication capacity under wireless communication have been considered, for example, a method for searching for a new available frequency band in all frequency bands, and a method for increasing efficiency of limited resources.

As representative examples of the latter method indicating the method for increasing the efficiency of limited resources, a transceiver includes a plurality of antennas to guarantee an additional space utilizing resources so that a diversity gain is acquired, or MIMO communication technologies for increasing transmission capacity by transmitting data via individual antennas in parallel have been developed by many companies or developers. Particularly, a Multiple-Input Multiple-Output (MIMO) system based on an Orthogonal Frequency Division Multiplexing (OFDM) from among the MIMO communication technologies will be called a MIMO-OFDM system.

The MIMO-OFDM system requires a variety of technologies for increasing a Tx reliability of data, for example, a Space-Time Code (STC) or Cyclic Delay Diversity (CDD) scheme to increase a spatial diversity gain, and a BeamForming (BF) or Precoding scheme to increase a Signal-to-Noise Ratio (SNR). In this case, the STC or CDD scheme has been used to increase a Tx reliability of an open-loop system which is incapable of using feedback information at a transmission end, and the BF or Precoding scheme has been used to maximize the SNR using corresponding feedback information of a closed-loop system which is capable of using feedback information at a transmission end.

The MIMO-OFDM system may spatially have one or more codewords according to a spatial multiplexing rate. If a specific structure spatially has a single codeword, this structure is called a single codeword (SCW) structure. If a specific structure spatially has a plurality of codewords, this structure is called a multiple codeword (MCW) structure.

According to the MIMO-OFDM system which uses the multiple codeword (MCW), the transmission end performs the coding or encoding process for individual streams independent of each other. The transmission end has a multiple-coder of a mapping-block for each stream. The MIMO scheme is applied to a multiple stream (i.e., multi-stream) generated by the multiple-coder, such that the resultant multi-scream is transmitted to a destination. According to the MIMO scheme used by the transmission end, the reception end detects the spatial-multiplexed reception (Rx) signal using an appropriate receiver, and receives the resultant signal.

In this case, according to the transmission scheme of the MIMO-OFDM system which uses the conventional multiple codeword (MCW), the transmission end includes an independent encoding block for each stream, such that a spatial diversity gain is reduced when each stream is detected and decoded by the reception end. Also, the number of multiple codewords (MCWs) must be equal to or less than a spatial multiplexing rate (Rank: R), such that unexpected limitations occur when the Rx scheme is used.

DISCLOSURE

Technical Problem

Accordingly, the present invention is directed to a method for transmitting/receiving a multiple codeword in a Multiple-Input Multiple-Output (MIMO) communication system that substantially obviates one or more problems due to limitations and disadvantages of the related art.

An object of the present invention is to provide a method for transmitting a multiple codeword in a MIMO communication system, and a method for receiving the multiple codeword in the MIMO communication system.

Technical Solution

To achieve these objects and other advantages and in accordance with the purpose of the invention, as embodied and broadly described herein, a method for transmitting a multiple codeword (MCW) in a Multiple-Input Multiple-Output (MIMO) communication system, the method comprising: a) performing a channel coding and modulation process for each codeword of the multiple codeword (MCW); b) multiplying the channel-coded-modulated result by a rotation matrix decided by either a spatial multiplexing rate or a layer (R), and performing a codeword permutation (CP) on the multiple codeword (MCW); c) performing a MIMO encoding on the multiple codeword (MCW); and d) transmitting the multiple codeword (MCW) via a multi-antenna.

Preferably, the rotation matrix is changed according to a resource index (k).

Preferably, the rotation matrix is changed according to a resource index (k), and the same rotation matrix is applied to consecutive resources of a predetermined number 'l'.

Preferably, the rotation matrix is selectively used from among a predetermined number of fixed matrixes.

Preferably, the method further comprises: determining whether the rotation matrix is used or not according to configuration information.

Preferably, the MIMO encoding step c) uses at least one of a predetermined space-time code, a precoding matrix, a diagonal matrix for a phase shift, and a unitary matrix.

Preferably, the precoding matrix includes an antenna selection matrix or an antenna hopping matrix.

In another aspect of the present invention, there is provided a method for transmitting a multiple codeword (MCW) in a Multiple-Input Multiple-Output (MIMO) communication system, the method comprising: a) performing a channel coding and modulation process for each codeword of the multiple codeword (MCW); b) performing a codeword permutation (CP) scheme on the multiple codeword (MCW), and performing a modified MIMO encoding on the resultant multiple codeword (MCW); and c) transmitting the multiple codeword (MCW) via a multi-antenna.

Preferably, at the MIMO encoding step b), the codeword permutation (CP) scheme is selectively used for each resource in one or more fixed matrixes.

Preferably, at the MIMO encoding step b), at least one space-time code decided by a spatial multiplexing rate or a layer (R) is selectively used for each resource, and the at least one space-time code may be transmitted via different antennas if the same codeword is used.

Preferably, at the MIMO encoding step b), a specific matrix generated by the product of at least one of a rotation matrix, a precoding matrix, a phase-shift diagonal matrix, and a unitary matrix may be used, and the precoding matrix may include an antenna selection matrix and an antenna hopping matrix.

Preferably, at least one of the rotation matrix, the precoding matrix, the diagonal matrix, and the unitary matrix may be changed according to the resource index (k). Preferably, at least one of the rotation matrix, the precoding matrix, the diagonal matrix, and the unitary matrix may be changed according to the resource index (k), and the same matrix may be used for consecutive matrixes of a predetermined number 'l'.

Preferably, at least one of the rotation matrix, the precoding matrix, the diagonal matrix, and the unitary matrix may be used or unused according to configuration information.

In another aspect of the present invention, there is provided a method for receiving a multiple codeword (MCW) in a Multiple Input Multiple-Output (MIMO) communication system, the method comprising: a) performing a channel coding and modulation process for each codeword of the multiple codeword (MCW), performing a codeword permutation (CP) scheme on each resulting codeword of the multiple codeword (MCW), and receiving the CP-processed multiple codeword (MCW); and b) performing a MIMO decoding on the received multiple codeword (MCW).

Preferably, the method further comprises: transmitting strong codeword indication (SCI) information indicating a high-channel-quality codeword contained in the received multiple codeword (MCW).

Preferably, the codeword permutation (CP) scheme is performed by multiplying the channel-coded-modulated result by a rotation matrix decided by either a spatial multiplexing rate or a layer (R).

Preferably, the rotation matrix is changed according to a resource index (k).

Preferably, the rotation matrix is changed according to a resource index (k), and the same rotation matrix is applied to consecutive resources of a predetermined number 'l'.

Preferably, the method further comprises: determining whether the rotation matrix is used or not according to configuration information.

Preferably, the codeword permutation (CP) scheme is performed by a MIMO encoding process which is selectively used for each resource in one or more fixed matrixes.

It is to be understood that both the foregoing general description and the following detailed description of the present invention are exemplary and explanatory and are intended to provide further explanation of the invention as claimed.

Advantageous Effects

According to the inventive transmission/reception method based on the MIMO-OFDM system which uses the multiple codeword, a codeword permutation (CP) scheme may be further performed.

The codeword permutation (CP) scheme is further added, such that a variety of MIMO transmission schemes are modified, resulting in the implementation of a high diversity gain.

Also, an amount of feedback information is reduced, and a performance of a receiver can be improved.

In addition, the present invention is able to make the number of codewords, irrespective of a spatial multiplexing rate or a rank.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the preferred embodiments of the present invention, examples of which are illustrated in, the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

Figure 1:
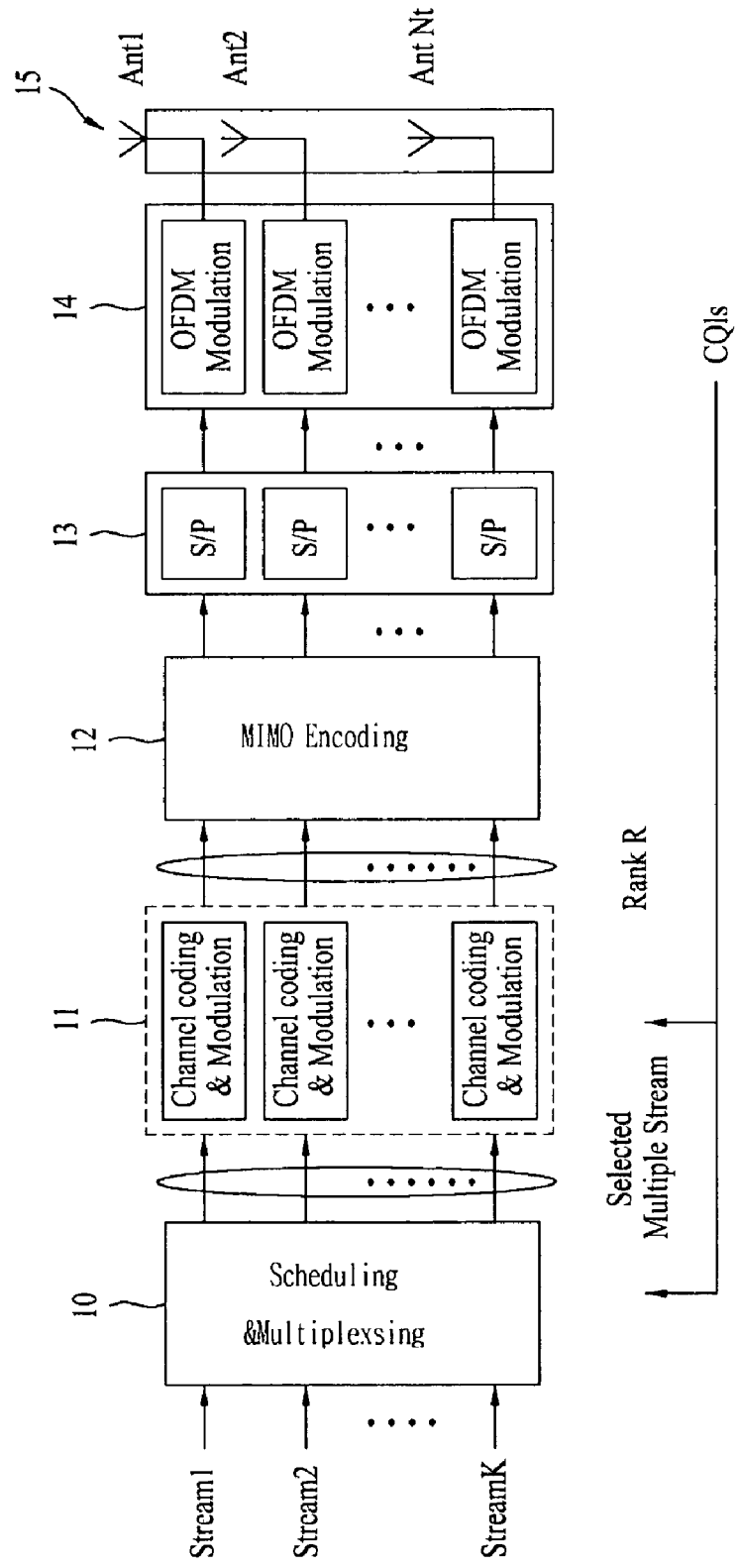
FIG. 1 is a block diagram illustrating a transmission end of a MIMO-OFDM system.

FIG. 1 is a block diagram illustrating a transmission end of a MIMO-OFDM system according to the present invention.

FIG. 1 shows an OFDM system including several Tx/Rx antennas. Namely, FIG. 1 shows the MCW structure by which the MIMO-OFDM system transmits the multiple codeword (MCW). The transmission end of FIG. 1 applies the MIMO scheme including R number of spatial multiplexing rates (i.e., R spatial multiplexing rates) from K number of streams (i.e., K streams) using the scheduling and multiplexing schemes, such that it transmits the resultant signal. Namely, R streams can be simultaneously transmitted via several Tx antennas. In this case, individual streams may be used as Tx signal(s) of one or more users.

A Scheduling & Multiplexing block 10 allows the transmission end to decide a user equipment (UE) at which downlink data will be received, such that it may perform the scheduling and multiplexing operation to allocate limited resources. In this case, the reception end may use rank information and channel quality information, which are transmitted as feedback information. At least one data stream selected by the above scheduling is applied to the Channel coding & Modulation block 11.

In order to reduce the channel-associated effect or the noise-associated effect, the channel coding & modulation block 11 may add error detection bits (e.g., cyclic redundancy check (CRC) bits) to the individual information bits, and may also add the redundant information for error correction to the individual information bits. The error correction code may be determined to be any one of a turbo code, a Low Density Parity Check (LDPC) code, and other convolution codes. The error correction code is not limited to the above-mentioned codes, and may also be set to various codes for error protection.

The channel coding & modulation block 11 additionally modulates the encoded data of the information bit stream according to a modulation scheme, such that it provides transmission symbols. In other words, the encoded data created by the channel coding is mapped to symbols indicating constellation positions by amplitudes and phases. There is no limitation in the above-mentioned modulation scheme. For example, an m-PSK (m-quadrature phase shift keying) scheme or an m-QAM (m-quadrature amplitude modulation) scheme may be used as the above-mentioned modulation scheme. For example, the m-PSK scheme may be a BPSK, a QPSK, or an 8-PSK. The m-QAM scheme may be a 16-QAM, a 64-QAM, or a 256-QAM.

FIG. 1 is a block diagram illustrating a transmission end for transmitting a multiple codeword (MCW) in a MIMO-OFDM system according to the present invention. By the transmission end of FIG. 1, individual streams are generated via the C number of independent channel coding & modulation blocks. Here, C should be equal or smaller than R and if C is larger than 1, the system is operated with multiple codeword. In association with several data streams, if the channel coding and modulation process is performed on a specific unit by each of several channel coding & modulation blocks, this specific unit may be called a codeword. One or more coded & modulated stream from a specific unit can be defined as a codeword. Namely, it should be noted that the channel coding and modulation operation is independently performed on each codeword. In this way, one or more codeword is applied to a MIMO encoding unit 12.

The MIMO encoding unit 12 converts data symbols of several coded & modulated streams into space-time signals according to a variety of MIMO schemes. In this case, a variety of MIMO schemes may be used as the MIMO scheme. For example, a space-time code (STC) scheme, a cyclic delay diversity (CDD) scheme, an antenna selection or antenna hopping scheme, a beamforming (BF) scheme, and a precoding scheme may be used as the MIMO scheme. The beamforming (BF) scheme or the precoding scheme may be applied to the MIMO encoding unit 12 using feedback information received from the reception end.

The MIMO-encoded streams are applied to a serial/parallel (S/P) block 13, such that serial data is converted into parallel data. Each streams to which the MIMO scheme has been applied is OFDM-modulated by an OFDM modulation block 14, such that the OFDM modulation result will be transmitted to the reception end.

By the above-mentioned method, a signal transmitted to at least one reception end is received in each reception end. The space-time code (STC) received via a MIMO decoder of each reception end is converted into each data symbol. The converted data symbol is converted into bit information by a demapper, and a parallel signal may be converted into a serial signal by the S/P block. The channel code is decoded by the channel decoder, such that the last data can be estimated. The structure of the reception end can be understood by an inverse structure of the transmission end, such that a detailed description thereof will herein be omitted for the convenience of description.

In this case, according to the transmission scheme of the MIMO-OFDM system employing the conventional multiple codeword (MCW), each codeword has an independent encoding block. Therefore, when each codeword is detected and decoded in the reception end, a spatial diversity gain is reduced, and the number of multiple codewords (MCWs) must be equal to or less than a spatial multiplexing rate (Rank: R), such that unexpected limitations or problems may occur in the Rx scheme.

The present invention is characterized in that the transmission end of the MIMO-OFDM system for transmitting the multiple codeword (MCW) additionally uses the codeword permutation (CP) scheme. For example, the codeword permutation (CP) scheme may be used as a method for modifying a variety of MIMO schemes. For another example, the codeword permutation (CP) operation may be independently performed.

Figure 2:
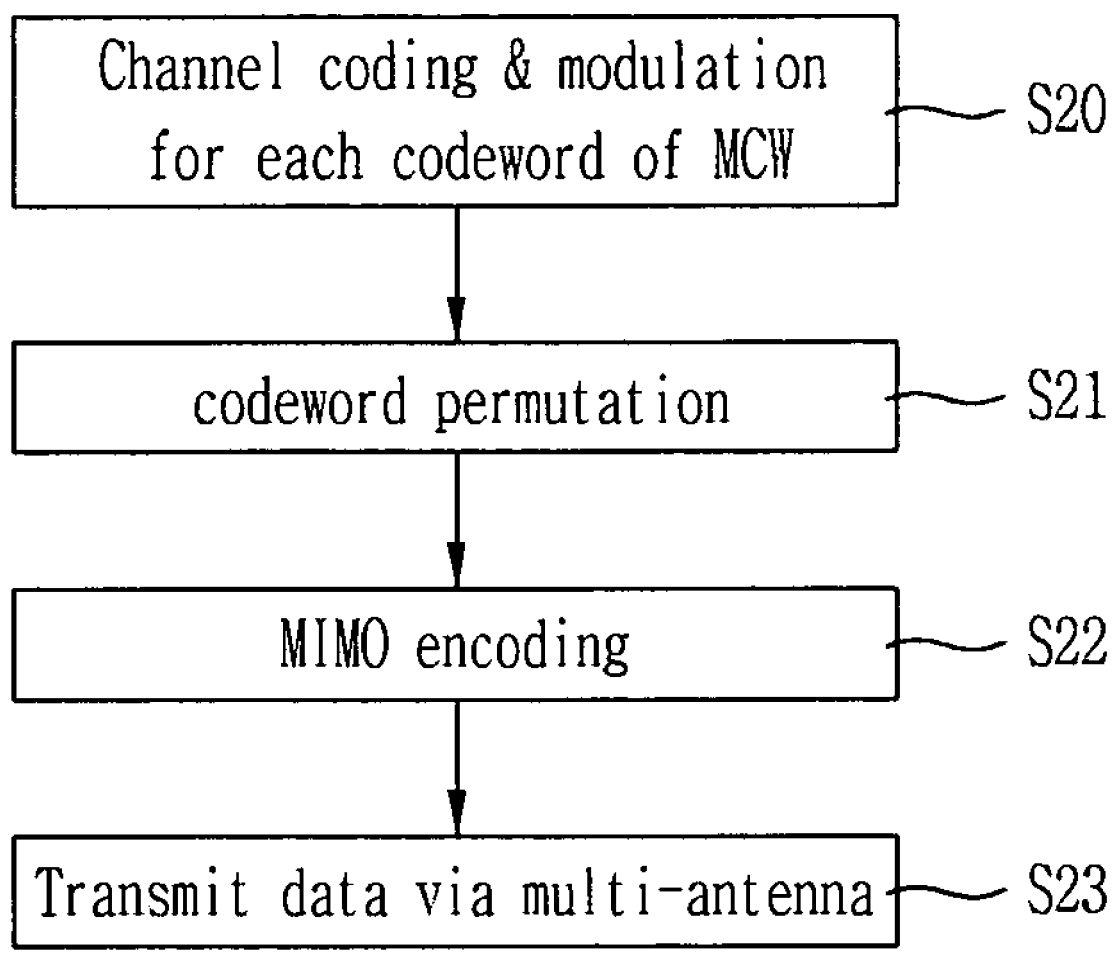
FIG. 2 is a flow chart illustrating a method for transmitting a multiple codeword (MCW) in a MIMO-OFDM system according to one embodiment of the present invention.

FIG. 2 is a flow chart illustrating a method for transmitting a multiple codeword (MCW) in a MIMO-OFDM system according to one embodiment of the present invention.

Referring to FIG. 2, a transmission end (e.g., a base station (BS)) performs the channel coding and modulation process for each codeword at step S20. Detailed description of the channel encoding and modulation can be easily understood by the channel coding & modulation block 11 of FIG. 1, such that it will herein be omitted for the convenience of description.

The codeword permutation is performed at step S21. The codeword permutation indicates that several coded & modulated streams transmitted to a sub-frame are permutation-processed such that individual resources use different Tx antennas. In this case, a first or second permutation scheme may be used as a codeword permutation (CP) scheme for the coded & modulated streams. The first permutation scheme is changed according to a resource index or sub-carrier index allocated to virtual resources. The second permutation scheme may be selectively used in the predetermined number of prescribed ranges.

At step S22, the MIMO coding process is performed on the codeword to which the codeword permutation (CP) scheme has been applied. At step S23, the MIMO coding result is transmitted to a reception end (e.g., at least one terminal) via the multiple antenna. In the meantime, the codeword permutation (CP) of the step S21 and the MIMO encoding process of the step S22 may be performed independent of each other. Although the codeword permutation (CP) of the step S21 and the MIMO encoding process of the step S22 have been combined with each other, it should be noted that the same result as that of the above independent case will be acquired. Embodiments of the codeword permutation operation of the step S21 will hereinafter be described in detail.

Figure 3:
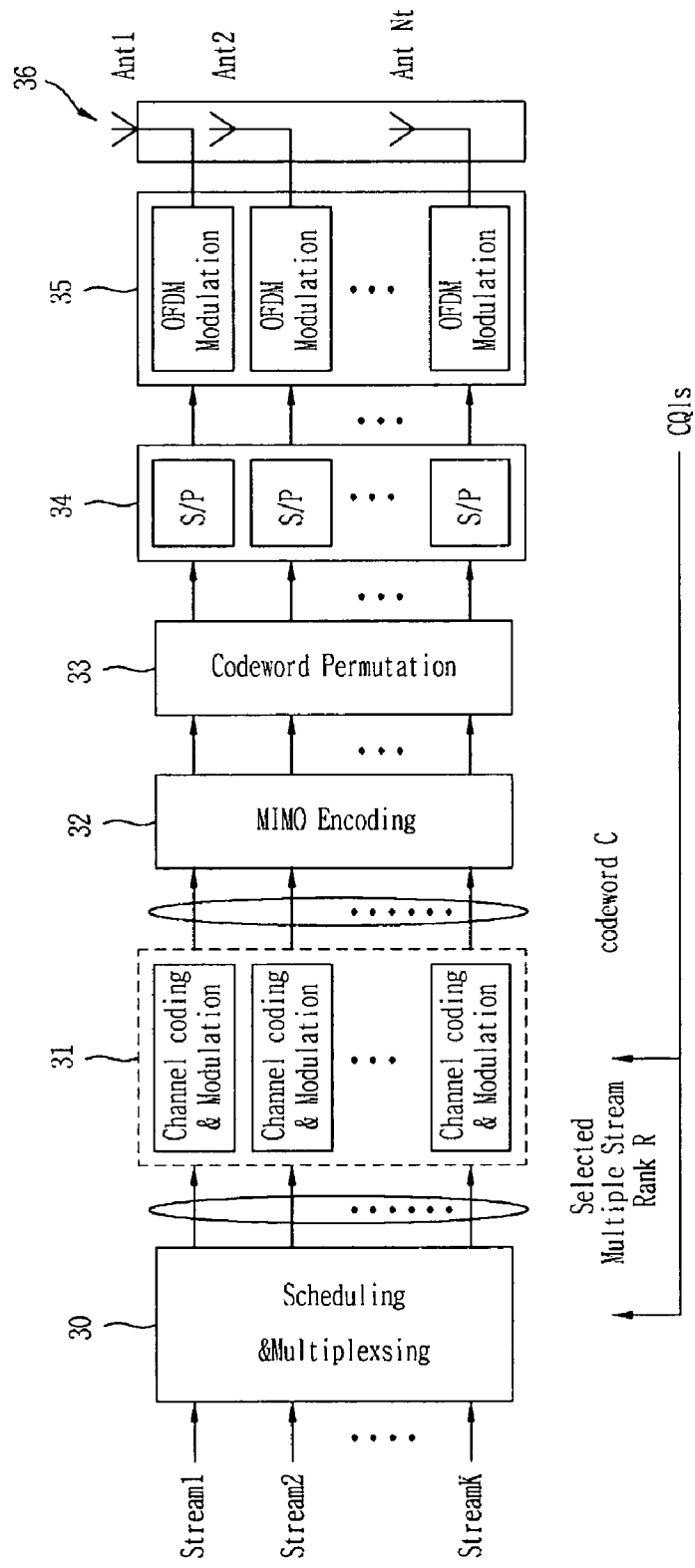
FIG. 3 is a block diagram illustrating a structure of a transmission end for transmitting a multiple codeword in a MIMO-OFDM system according to one embodiment of the present invention.

FIG. 3 is a block diagram illustrating a transmission end for transmitting a multiple codeword in a MIMO-OFDM system according to one embodiment of the present invention.

FIG. 3 shows an OFDM system including several Tx/Rx antennas. Namely, FIG. 3 shows the MCW structure by which the MIMO-OFDM system transmits the multiple codeword (MCW). According to this MCW structure, the MIMO scheme including R number of spatial multiplexing rates (i.e., R spatial multiplexing rates) is applied from K number of streams (i.e., K streams) using the scheduling and multiplexing schemes. Namely, R coded & modulated streams can be simultaneously transmitted via several Tx antennas. In this case, each stream may be used as Tx signal(s) of one or more users.

The Scheduling & Multiplexing block 30 and the channel coding & modulation block 31 are equal to those of FIG. 1. In the case of using the codeword permutation scheme according to the present invention, the number of codeword may be decided without being limited to the spatial multiplexing rate (Rank: R). The generated coded & modulated streams from at least one codeword are applied to the codeword permutation block 32 according to this embodiment.

The codeword permutation (CP) scheme performed by the codeword permutation (CP) block 32 may use a rotation matrix for each resource index according to the spatial multiplexing rate, as shown in the following table 1.

TABLE 1

| Spatial multiplexing rate | Rotation matrix |
|---|---|
| Spatial multiplexing rate 2 | $\Phi_{2\times 2}^{k} = \begin{pmatrix} 0 & 1 \\ 1 & 0 \end{pmatrix}^{k}$ |
| Spatial multiplexing rate 3 | $\Phi_{3\times 3}^{k} = \begin{pmatrix} 0 & 1 & 0 \\ 0 & 0 & 1 \\ 1 & 0 & 0 \end{pmatrix}^{k}$ or $\Phi_{3\times 3}^{k} = \begin{pmatrix} 0 & 0 & 1 \\ 1 & 0 & 0 \\ 0 & 1 & 0 \end{pmatrix}^{k}$ |
| Spatial multiplexing rate 4 | $\Phi_{4\times 4}^{k} = \begin{pmatrix} 0 & 1 & 0 & 0 \\ 0 & 0 & 1 & 0 \\ 0 & 0 & 0 & 1 \\ 1 & 0 & 0 & 0 \end{pmatrix}^{k}$ or $\Phi_{4\times 4}^{k} = \begin{pmatrix} 0 & 0 & 1 & 0 \\ 0 & 0 & 0 & 1 \\ 1 & 0 & 0 & 0 \\ 0 & 1 & 0 & 0 \end{pmatrix}^{k}$ or $\Phi_{4\times 4}^{k} = \begin{pmatrix} 0 & 0 & 0 & 1 \\ 1 & 0 & 0 & 0 \\ 0 & 1 & 0 & 0 \\ 0 & 0 & 1 & 0 \end{pmatrix}^{k}$ |

Table 1 shows exemplary rotation matrixes available for the codeword permutation (CP) scheme under the spatial multiplexing rates of 2, 3, and 4. As can be seen from individual rotation matrixes of Table 1, 'k' is indicative of an index allocated to each resource. In this case, the resource may be a virtual resource or sub-carrier available for the scheduling.

As can be seen from the individual rotation matrixes of Table 1, as the 'k' value is changed in the order of 1, 2, . . . , the selected streams for individual streams are rotated in different matrixes. For example, if the spatial multiplexing rate is 2, as the 'k' value is changed in the order of 1, 2, . . . , two rotation matrixes $$\begin{pmatrix} 0 & 1 \\ 1 & 0 \end{pmatrix} \text{ and } \begin{pmatrix} 1 & 0 \\ 0 & 1 \end{pmatrix}$$

are sequentially rotated. Namely, if the rotation matrix is multiplied by the codeword, a stream to which each codeword for each resource belongs is rotated. In Table 1, if the spatial multiplexing rate is 3, three matrixes can be sequentially rotated and used. If the spatial multiplexing rate is 4, four matrixes can be sequentially rotated and used.

The MCW to which the codeword permutation is applied is applied to the MIMO encoding unit 33, such that the resultant MCW is converted into the space-time signal by various MIMO schemes. The MIMO-encoded MCW is applied to the S/P block 34. The S/P block 34 converts serial data into parallel data. The MIMO-processed codeword is OFDM-modulated by the OFDM modulation block 35, such that the OFDM result will be transmitted to the reception end via the multi-antenna 36.

In the case of using the codeword permutation (CP) scheme, the present invention acquires a high diversity gain, and reduces an amount of feedback information, resulting in an increased performance of the transmission/reception end of the MIMO-OFDM system. Also, the codeword may be configured irrespective of the spatial multiplexing rate or the rank (R).

The above-mentioned rotation matrix illustrates an exemplary rotation matrix which is changed according to the resource index 'k'. In order to use the same index during a predetermined interval according to individual situations, the following rotation matrix of Table 2 can be used.

TABLE 2

| Spatial multiplexing rate | Rotation matrix |
|---|---|
| Spatial multiplexing rate 2 | $\Phi_{2\times 2}^{k} = \begin{pmatrix} 0 & 1 \\ 1 & 0 \end{pmatrix}^{\lfloor \frac{k}{7} \rfloor}$ |
| Spatial multiplexing rate 3 | $\Phi_{3\times 3}^{k} = \begin{pmatrix} 0 & 1 & 0 \\ 0 & 0 & 1 \\ 1 & 0 & 0 \end{pmatrix}^{\lfloor \frac{k}{7} \rfloor}$ or $\Phi_{3\times 3}^{k} = \begin{pmatrix} 0 & 0 & 1 \\ 1 & 0 & 0 \\ 0 & 1 & 0 \end{pmatrix}^{\lfloor \frac{k}{7} \rfloor}$ |
| Spatial multiplexing rate 4 | $\Phi_{4\times 4}^{k} = \begin{pmatrix} 0 & 1 & 0 & 0 \\ 0 & 0 & 1 & 0 \\ 0 & 0 & 0 & 1 \\ 1 & 0 & 0 & 0 \end{pmatrix}^{\lfloor \frac{k}{7} \rfloor}$ or |

TABLE 2-continued

| Spatial multiplexing rate | Rotation matrix |
|---|---|
| | $\Phi_{4\times4}^{k} = \begin{pmatrix} 0 & 0 & 1 & 0 \\ 0 & 0 & 0 & 1 \\ 1 & 0 & 0 & 0 \\ 0 & 1 & 0 & 0 \end{pmatrix}^{\lfloor \frac{k}{l} \rfloor}$ or |
| | $\Phi_{4\times4}^{k} = \begin{pmatrix} 0 & 0 & 0 & 1 \\ 1 & 0 & 0 & 0 \\ 0 & 1 & 0 & 0 \\ 0 & 0 & 1 & 0 \end{pmatrix}^{\lfloor \frac{k}{l} \rfloor}$ |

With reference to individual rotation matrixes of Table 2, is indicative of an index allocated to each resource. In this case, the resource may be a virtual resource or sub-carrier available for the scheduling. In Table 2, 'k' is indicative of a rotation length factor which is able to establish a predetermined interval in which the same index (i.e., the same rotation matrix) is used. In this case, 'l' may be a predetermined value pre-recognized by the transmission/reception end, or may be decided by the transmission or reception end and be then informed. Also, 'l' may be changed in different ways according to channel situations. For example, 'l' may be set to the spatial multiplexing rate 'R'.

In addition, if there is no rotation in each rotation matrix of Tables 1 and 2, 'k' is set to '0', such that no rotation occurs. This relationship can be represented by the following equation 1.

$$\text{rotation} \begin{cases} \text{on,} & k = \text{subcarrier index} \\ \text{off,} & k = 0 \end{cases} \quad \text{[Equation 1]}$$

A switching factor may be added to the rotation matrix and be then used, such that the same method as that of Equation 1 can be switched on or off according to individual situations. This relationship can be represented by the following Table 3.

TABLE 3

| Spatial multiplexing rate | Rotation matrix |
|---|---|
| Spatial multiplexing rate 2 | $\Phi_{2\times2}^{k} = \begin{pmatrix} 0 & 1 \\ 1 & 0 \end{pmatrix}^{k\delta}$ |
| Spatial multiplexing rate 3 | $\Phi_{3\times3}^{k} = \begin{pmatrix} 0 & 1 & 0 \\ 0 & 0 & 1 \\ 1 & 0 & 0 \end{pmatrix}^{k\delta}$ or $\Phi_{3\times3}^{k} = \begin{pmatrix} 0 & 0 & 1 \\ 1 & 0 & 0 \\ 0 & 1 & 0 \end{pmatrix}^{k\delta}$ |
| Spatial multiplexing rate 4 | $\Phi_{4\times4}^{k} = \begin{pmatrix} 0 & 1 & 0 & 0 \\ 0 & 0 & 1 & 0 \\ 0 & 0 & 0 & 1 \\ 1 & 0 & 0 & 0 \end{pmatrix}^{k\delta}$ or |
| | $\Phi_{4\times4}^{k} = \begin{pmatrix} 0 & 0 & 1 & 0 \\ 0 & 0 & 0 & 1 \\ 1 & 0 & 0 & 0 \\ 0 & 1 & 0 & 0 \end{pmatrix}^{k\delta}$ or |
| | $\Phi_{4\times4}^{k} = \begin{pmatrix} 0 & 0 & 0 & 1 \\ 1 & 0 & 0 & 0 \\ 0 & 1 & 0 & 0 \\ 0 & 0 & 1 & 0 \end{pmatrix}^{k\delta}$ |

With reference to Table 3, the switching factor ($\delta$) is additionally applied to the rotation matrix of Table 1, such that there is provided a method for controlling whether to use the rotation matrix according to the switching factor ($\delta$). In this case, the switching factor ($\delta$) for determining whether to use the rotation matrix can be represented by the following equation 2.

$$\delta \begin{cases} 1: \text{on} \\ 0: \text{off} \end{cases} \quad \text{[Equation 2]}$$

The above-mentioned method for additionally employing the switching factor ($\delta$) may also be applied to the above-mentioned method in which the same index is used during a predetermined interval according to the above situations shown in Table 2. This relationship can be represented by the following table 4.

TABLE 4

| Spatial multiplexing rate | Rotation matrix |
|---|---|
| Spatial multiplexing rate 2 | $\Phi_{2\times2}^{k} = \begin{pmatrix} 0 & 1 \\ 1 & 0 \end{pmatrix}^{\lfloor \frac{k}{l} \rfloor \delta}$ |
| Spatial multiplexing rate 3 | $\Phi_{3\times3}^{k} = \begin{pmatrix} 0 & 1 & 0 \\ 0 & 0 & 1 \\ 1 & 0 & 0 \end{pmatrix}^{\lfloor \frac{k}{l} \rfloor \delta}$ or $\Phi_{3\times3}^{k} = \begin{pmatrix} 0 & 0 & 1 \\ 1 & 0 & 0 \\ 0 & 1 & 0 \end{pmatrix}^{\lfloor \frac{k}{l} \rfloor \delta}$ |
| Spatial multiplexing rate 4 | $\Phi_{4\times4}^{k} = \begin{pmatrix} 0 & 1 & 0 & 0 \\ 0 & 0 & 1 & 0 \\ 0 & 0 & 0 & 1 \\ 1 & 0 & 0 & 0 \end{pmatrix}^{\lfloor \frac{k}{l} \rfloor \delta}$ or |
| | $\Phi_{4\times4}^{k} = \begin{pmatrix} 0 & 0 & 1 & 0 \\ 0 & 0 & 0 & 1 \\ 1 & 0 & 0 & 0 \\ 0 & 1 & 0 & 0 \end{pmatrix}^{\lfloor \frac{k}{l} \rfloor \delta}$ or |
| | $\Phi_{4\times4}^{k} = \begin{pmatrix} 0 & 0 & 0 & 1 \\ 1 & 0 & 0 & 0 \\ 0 & 1 & 0 & 0 \\ 0 & 0 & 1 & 0 \end{pmatrix}^{\lfloor \frac{k}{l} \rfloor \delta}$ |

The above-mentioned rotation matrixes shown in Table 1 can also be represented by other formats shown in the following table 5:

TABLE 5

| Spatial multiplexing rate (Rank R) | Rotation matrix $\Phi_{R \times R}^{k}$ | $\delta$ Large delay |
|---|---|---|
| 1 | $[1]$ | 0 |
| 2 | $\begin{bmatrix} 1 & 1 \\ e^{-j2\pi \cdot k \cdot \delta - \pi} & e^{-j(2\pi \cdot k \cdot \delta - \pi)} \end{bmatrix}$ | 1/2 |
| 3 | $\begin{bmatrix} 1 & 1 & 1 \\ e^{-j2\pi \cdot k \cdot \delta} & e^{-j(2\pi \cdot k \cdot \delta - 2\pi/3)} & e^{-j(2\pi \cdot k \cdot \delta - 4\pi/3)} \\ e^{-j2\pi \cdot k \cdot 2\delta} & e^{-j(2\pi \cdot k \cdot 2\delta - 4\pi/3)} & e^{-j(2\pi \cdot k \cdot 2\delta - 2\pi/3)} \end{bmatrix}$ | 1/3 |
| 4 | $\begin{bmatrix} 1 & 1 & 1 & 1 \\ e^{-j2\pi \cdot k \cdot \delta} & e^{-j(2\pi \cdot k \cdot \delta - \pi/2)} & e^{-j(2\pi \cdot k \cdot \delta - \pi)} & e^{-j(2\pi \cdot k \cdot \delta - 3\pi/2)} \\ e^{-j2\pi \cdot k \cdot 2\delta} & e^{-j(2\pi \cdot k \cdot 2\delta - \pi)} & e^{-j2\pi \cdot k \cdot 2\delta} & e^{-j(2\pi \cdot k \cdot 2\delta - \pi)} \\ e^{-j2\pi \cdot k \cdot 3\delta} & e^{-j(2\pi \cdot k \cdot 3\delta - 3\pi/2)} & e^{-j(2\pi \cdot k \cdot 3\delta - \pi/2)} & e^{-j(2\pi \cdot k \cdot 3\delta - \pi)} \end{bmatrix}$ | 1/4 |

Table 5 shows exemplary rotation matrixes available for the codeword permutation (CP) scheme under the spatial multiplexing rates of 1, 2, 3, and 4. As can be seen from individual rotation matrixes of Table 5, 'k' is indicative of an index allocated to each resource. In this case, the resource may be a virtual resource or sub-carrier available for the scheduling. In this case, each rotation matrix may be configured in the form of the product of a diagonal matrix and a unitary matrix for a phase shift, as represented by the following equation 3.

$$\Phi_{R \times R}^{k} = D(k)U \qquad \text{[Equation 3]}$$

In Equation 3, D(k) is indicative of a diagonal matrix, and U is a unitary matrix. In Equation 3, the D(k) matrix and the U matrix are shown in the following table 6.

In the case of using Table 5 and the rotation matrixes of the Table 5, a method for using the rotation length factor 'l' and the switching factor 'δ' can be applied to the present invention. Although this method is not shown, 'k' contained in the rotation matrix of each Table may be changed to $$\left\lfloor \frac{k}{l} \right\rfloor, k\delta, \text{ or } \left\lfloor \frac{k}{l} \right\rfloor \delta.$$

Figure 4:
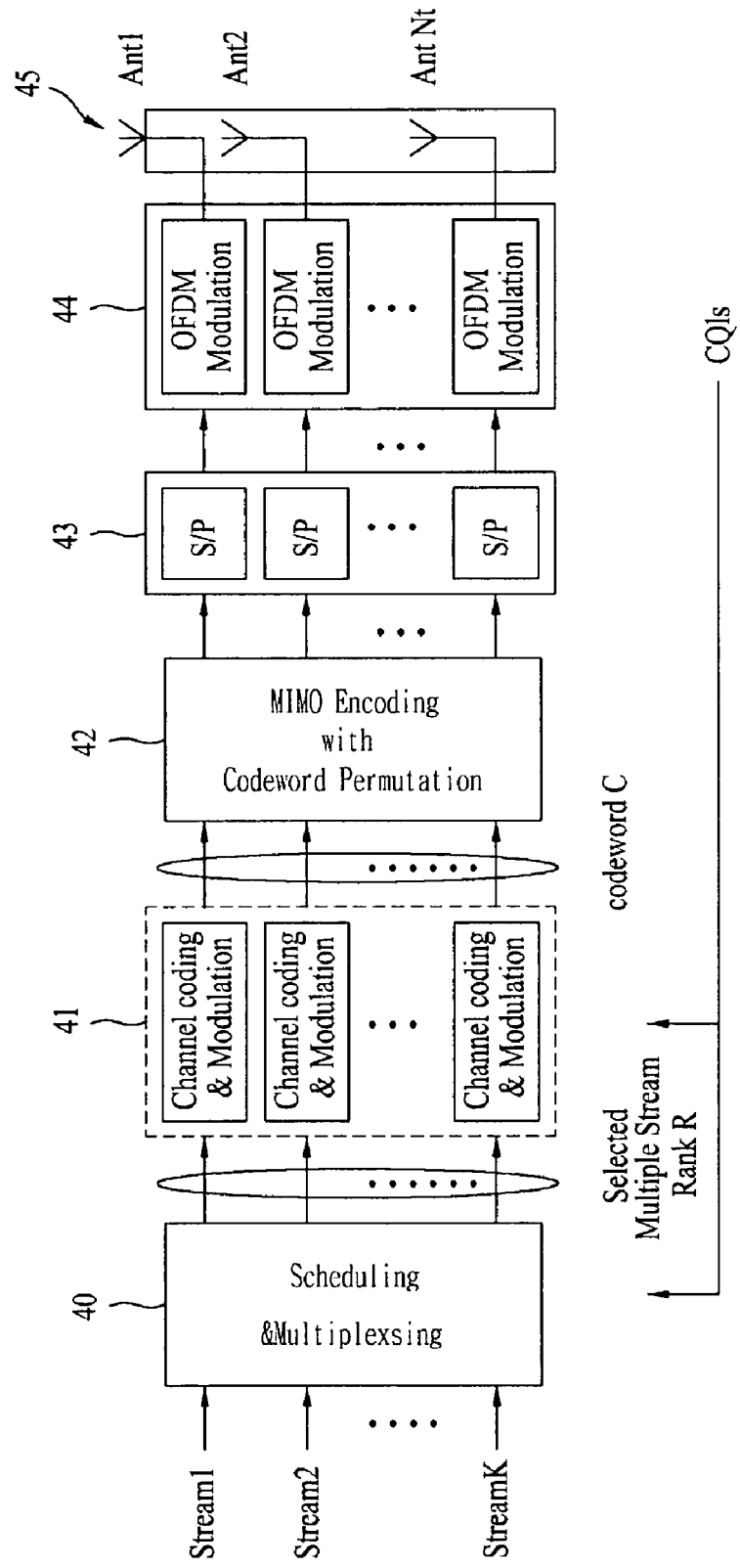
FIG. 4 is a block diagram illustrating a structure of a transmission end for transmitting a multiple codeword in a MIMO-OFDM system according to another embodiment of the present invention.

FIG. 4 is a block diagram illustrating a transmission end for transmitting a multiple codeword in a MIMO-OFDM system according to another embodiment of the present invention.

TABLE 6

| Spatial multiplexing rate (Rank R) | Unitary matrix U | Phase-shift diagonal matrix D(k) |
|---|---|---|
| 1 | $[1]$ | $[1]$ |
| 2 | $\begin{bmatrix} 1 & 1 \\ 1 & e^{-j2\pi/2} \end{bmatrix}$ | $\begin{bmatrix} 1 & 0 \\ 0 & e^{-j2\pi k/2} \end{bmatrix}$ |
| 3 | $\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi k/3} & 0 \\ 0 & 0 & e^{-j4\pi k/3} \end{bmatrix}$ |
| 4 | $\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi k/4} & 0 & 0 \\ 0 & 0 & e^{-j4\pi k/4} & 0 \\ 0 & 0 & 0 & e^{-j6\pi k/4} \end{bmatrix}$ |

The present invention will disclose a variety of modified MIMO schemes as an example of the codeword permutation (CP) scheme. FIG. 4 shows the MCW structure by which the MIMO-OFDM system transmits the multiple codeword (MCW). According to this MCW structure, the MIMO scheme including R number of spatial multiplexing rates (i.e., R spatial multiplexing rates) is applied from K number of streams (i.e., K streams) using the scheduling and multiplexing schemes. Namely, R coded & modulated streams can be simultaneously transmitted via several Tx antennas. In this case, each stream may be used as Tx signal(s) of one or more users.

The Scheduling & Multiplexing block 40 and the channel coding & modulation block 41 are equal to those of FIG. 1. The generated multiple codeword (MCW) is applied to the MIMO encoding with Codeword Permutation unit 42 for the codeword permutation (CP).

Namely, according to the present invention, the codeword permutation (CP) scheme performed by the codeword permutation (CP) block 32 of FIG. 3 is applied to a variety of MIMO schemes, such that the resultant signal is applied to the modified MIMO scheme. For example, if the space-time code (STC) from among various MIMO schemes is used, the present invention will disclose an application example of the codeword permutation (CP) scheme. If the MIMO encoding is performed by the space-time code (STC), the following table 7 shows various examples of the space-time code (STC).

In other words, the transmission end of the MIMO-OFDM system multiplies one of space time codes of Table 7 by the multiple codeword (MCW), such that the resultant space-time code (STC) is acquired. A method for performing the codeword permutation (CP) using a specific space-time code, which has the spatial multiplexing rate of 2 at the line (I), from among various space-time codes of Table 7 will hereinafter be described in detail.

If four Tx antennas are used and the spatial multiplexing rate is set to 2, for example, if the above-mentioned codeword permutation (CP) scheme is applied to the space-time code (STC) having the spatial multiplexing rate of 2 at the line (1) of Table 7, the following table 8 is acquired.

TABLE 8

| Case | Resource index (k) | STC Scheme |
|---|---|---|
| Case 1 | k = even number (k = 0, 2, 4, . . .) | $\begin{pmatrix} S_1^1 & S_2^1 \\ -S_2^{1*} & S_1^{1*} \\ S_1^2 & S_2^2 \\ -S_2^{2*} & S_1^{2*} \end{pmatrix}$ |

TABLE 7

| STC Scheme | # of Tx: antenna | Rank R | dp, min QPSK |
|---|---|---|---|
| (1) $\frac{1}{\sqrt{2}} \begin{bmatrix} S_1 & -S_2 \\ S_2 & S_1 \end{bmatrix}$ | 2 | 1 | 1 |
| (2) $\frac{1}{\sqrt{2}} \begin{bmatrix} S_1 \\ S_2 \end{bmatrix}$ | 2 | 2 | 1 |
| (3) $\frac{1}{\sqrt{2(1+r^2)}} \begin{bmatrix} S_1 + jr \cdot S_4 & r \cdot S_2 + S_3 \\ S_2 - r \cdot S_3 & jr \cdot S_1 + S_4 \end{bmatrix}, r = \sqrt{5} \pm 1/2$ | 2 | 2 | 0.2 |
| (4) $\frac{1}{2} \begin{bmatrix} S_1 & S_2 & S_3 & S_4 \\ S_2^* & -S_1^* & S_4^* & -S_3^* \\ S_3 & -S_4 & -S_1 & S_2 \\ S_4^* & S_3^* & -S_2^* & -S_1^* \end{bmatrix}$ | 4 | 1 | 4 |
| (5) $\frac{1}{\sqrt{2}} \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix}$ | 4 | 1 | 1 |
| (6) $\frac{1}{2} \begin{bmatrix} S_1 & -S_2^* & S_5 & -S_6^* \\ S_2 & S_1^* & S_6 & S_5^* \\ S_3 & -S_4^* & S_7 & -S_8^* \\ S_4 & S_3^* & S_8 & S_7^* \end{bmatrix}$ | 4 | 2 | 1 |

TABLE 8-continued

| Case | Resource index (k) | STC Scheme |
|---|---|---|
| | k = odd number (k = 1, 3, 5, ...) | $\begin{pmatrix} S_1^2 & S_2^2 \\ -S_2^{2*} & S_1^{2*} \\ S_1^1 & S_2^1 \\ -S_2^{1*} & S_1^{1*} \end{pmatrix}$ |
| Case 2 | k = even number (k = 0, 2, 4, ...) | $\begin{pmatrix} S_1^2 & S_2^2 \\ -S_2^{2*} & S_1^{2*} \\ S_1^1 & S_2^1 \\ -S_2^{1*} & S_1^{1*} \end{pmatrix}$ |
| | k = odd number (k = 1, 3, 5, ...) | $\begin{pmatrix} S_1^1 & S_2^1 \\ -S_2^{1*} & S_1^{1*} \\ S_1^2 & S_2^2 \\ -S_2^{2*} & S_1^{2*} \end{pmatrix}$ |

In the space-time codes of Table 8, $S_m^n$ is indicative of the m-th data symbol of the n-th codeword. According to the Case 1 of Table 8, space-time codes of a first codeword are transmitted via first and second antennas on the condition that the resource index is an even number. If the resource index is an odd number, the space-time codes of the first codeword are transmitted via third and fourth antennas. Space-time codes of a second codeword are transmitted via third and fourth antennas on the condition that the resource index is an even number. If the resource index is an odd number, the space-time codes of the second codeword are transmitted via first and second antennas. Namely, the Tx antenna via which individual codewords are transmitted according to the codeword permutation is changed to another according to the resource index.

Compared with the method of Case 1 of Table 8, according to the method of Case 2 of Table 8, the space-time code under the resource index of an odd number according to the Case 1 is equal to the space-time code under the resource index of an even number according to the Case 2, but the application method of the codeword permutation (CP) scheme of the Case 1 is equal to that of the Case 2. The present invention transmits signals using the space-time code to which the codeword permutation (CP) scheme is applied, such that a higher diversity gain can be acquired from the multiple codeword (MCW) environments.

According to another embodiment of the present invention, a method for applying the codeword permutation (CP) scheme to the precoding scheme from among various MIMO schemes will hereinafter be described.

Figure 5:
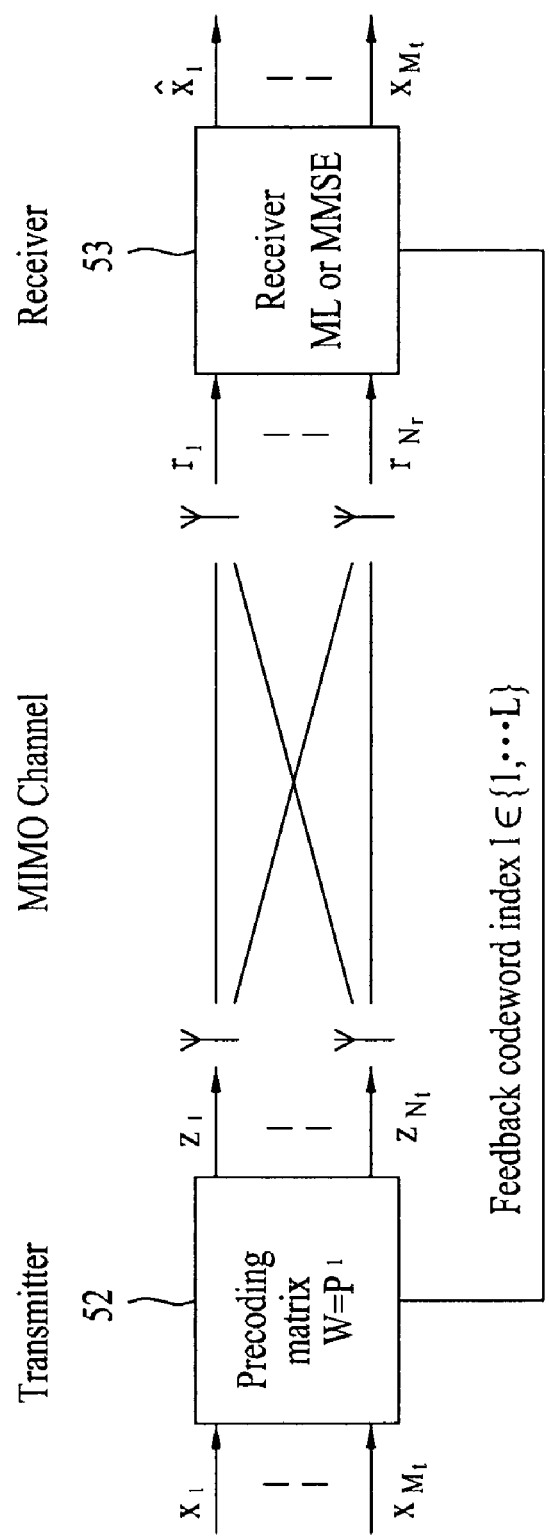
FIG. 5 is a block diagram illustrating a structure of a transmission/reception end for performing a precoding scheme in a MIMO system according to the present invention.

FIG. 5 is a block diagram illustrating a transmission/reception end for performing a precoding scheme in a MIMO system according to the present invention.

Specifically, FIG. 5 shows a transmission/reception end of the MIMO system of using the codebook-based precoding scheme. In this case, the MIMO encoder 52 of the transmission end multiplies the precoding matrix by the channel coded and modulated streams ($\chi_1$~$\chi_{Mt}$), such that the MIMO encoding is carried out. In this case, the MIMO encoder 52 may multiply the resultant streams by the precoding matrix according to the codebook-based precoding scheme. In this case, the transmission end and the reception end include limited precoding matrixes ($P_1$~$P_L$). The reception end feeds back the optimum precoding matrix index (I) to the transmission end using channel information. The transmission end applies the precoding matrix corresponding to the feedback index to transmission (Tx) data ($\chi_1$~$\chi_{Mt}$).

Generally, the precoding matrix contained in the codebook may be designed to have the nested property. In this case, according to the above-mentioned nested property, if the precoding matrix having R number of columns must use the precoding matrix having a low spatial multiplexing rate, the used matrix has the column of less than 'R'. In this case, provided that the precoding matrix having the low spatial multiplexing rate is composed of combinations of a predetermined column, this situation may be considered to have the nested property.

The following table 9 exemplarily shows a method for allocating the above-mentioned nested property to the precoding matrixes under the spatial multiplexing rates 1, 2, and 4 of the 4×4 precoding matrix.

TABLE 9

$$P_{4\times 4}^k = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

R: 1, R: 2, R: 4

In this case, Table 9 shows that the first column of a second unitary matrix, the first and second columns, and the first to fourth columns are selected according to the spatial multiplexing rate. However, it should be noted that the application scope of the present invention is not always limited to the above-mentioned examples. If the spatial multiplexing rate is 1, any one of first, second, third, and fourth columns may be selected. If the spatial multiplexing rate is 2, any two of first, second, third, and fourth columns may be selected.

For reference, if the present invention uses 3-bit feedback information in the IEEE 802.16e system, which includes two Tx antennas and supports the spatial multiplexing rate of 2, the following table 10 shows an example of available codebooks.

TABLE 10

| Matrix Index (binary) | Column 1 | Column 2 |
|---|---|---|
| 000 | 1 | 0 |
| | 0 | 1 |
| 001 | 0.7940 | −0.5801 − j0.1818 |
| | −0.5801 + j0.1818 | −0.7940 |
| 010 | 0.7940 | 0.0579 − j0.6051 |
| | 0.0579 + j0.6051 | −0.7940 |
| 011 | 0.7941 | −0.2978 + j0.5298 |
| | −0.2978 − j0.5298 | −0.7941 |
| 100 | 0.7941 | 0.6038 − j0.0689 |
| | 0.6038 + j0.0689 | −0.7941 |
| 101 | 0.3289 | 0.6614 − j0.6740 |
| | 0.6614 + j0.6740 | −0.3289 |
| 110 | 0.5112 | 0.4754 + j0.7160 |
| | 0.4754 − j0.7160 | −0.5112 |
| 111 | 0.3289 | −0.8779 + j0.3481 |
| | −0.8779 − j0.3481 | −0.3289 |

If the codeword permutation (CP) scheme is applied to the above-mentioned precoding scheme according to this embodiment, the following equation 4 is acquired.

$$Y = W_{N_t \times R}^k \Phi_{R \times R}^k s^k \quad \text{[Equation 4]}$$

Equation 4 shows a model of a transmission (Tx) signal which generates another. Tx signal (Y) to which the CP (Codeword Permutation)-processed MIMO scheme is applied. $W_{N_t \times R}^k$ indicative of $N_t \times R$ precoding matrix corresponding to the k-th resource index, $\Phi_{R \times R}^k$ is indicative of the R×R rotation matrix corresponding to the k-th resource index, and 's.' is indicative of a transmission signal vector (i.e., Tx-signal vector). The symbols contained in the Tx-signal vector may be considered to be signals generated from different codewords. In the meantime, the resource index 'k' may be a sub-carrier index or an index allocated to a virtual resource. As described above, 'k' is indicative of a rotation length factor $$\left(\text{e.g., } \left\lfloor \frac{k}{l} \right\rfloor, \left\lceil \frac{k}{l} \right\rceil \delta, \text{ or } \left\lfloor \frac{k}{l} \right\rfloor \delta \right)$$

which is able to establish a predetermined interval in which the same rotation matrix is used. Otherwise, 'k' may be modified to be used along with other variables such as the switching factor capable of determining whether to use the rotation matrix.

$W_{N_t \times R}^k$ may rotatably change the predetermined matrixes to others, and may use the changed matrixes. For example, provided that the set of predetermined matrixes or vectors is $P = \{P_1, P_2, P_3, P_4, \ldots, P_K\}$, 'W' is reconstructed by some or all of matrixes or vectors of the above set, such that the resultant W can be rotatably used according to the k value.

In this case, may be either the set of codebook matrixes or vectors used for a closed-loop structure, or the set of predetermined matrixes or vectors. Specifically, 'P' may be composed of an antenna selection matrix, an antenna-hopping matrix, an antenna selection vector, or an antenna hopping vector.

For example, if there are four Tx antennas, 'P' composed of the antenna selection matrix, the antenna hopping matrix, the antenna selection vector, or the antenna hopping vector may be configured in the form of the following expression:

$$R = 1, P = \{P_1, P_2, P_3, P_4\} = \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\} \quad \text{[Expression]}$$

$$R = 2,$$
$$P = \{P_1, P_2, P_3, P_4, P_5, P_6\} =$$
$$\left\{ \begin{bmatrix} 1 & 0 \\ 0 & 1 \\ 0 & 0 \\ 0 & 0 \end{bmatrix}, \begin{bmatrix} 1 & 0 \\ 0 & 0 \\ 0 & 1 \\ 0 & 0 \end{bmatrix}, \begin{bmatrix} 1 & 0 \\ 0 & 0 \\ 0 & 0 \\ 0 & 1 \end{bmatrix}, \begin{bmatrix} 0 & 0 \\ 1 & 0 \\ 0 & 1 \\ 0 & 0 \end{bmatrix}, \begin{bmatrix} 0 & 0 \\ 1 & 0 \\ 0 & 0 \\ 0 & 1 \end{bmatrix}, \begin{bmatrix} 0 & 0 \\ 0 & 0 \\ 1 & 0 \\ 0 & 1 \end{bmatrix} \right\}$$

$$R = 3,$$
$$P = \{P_1, P_2, P_3, P_4\} =$$
$$\left\{ \begin{bmatrix} 1 & 0 & 0 \\ 0 & 1 & 0 \\ 0 & 0 & 1 \\ 0 & 0 & 0 \end{bmatrix}, \begin{bmatrix} 1 & 0 & 0 \\ 0 & 1 & 0 \\ 0 & 0 & 0 \\ 0 & 0 & 1 \end{bmatrix}, \begin{bmatrix} 1 & 0 & 0 \\ 0 & 0 & 0 \\ 0 & 1 & 0 \\ 0 & 0 & 1 \end{bmatrix}, \begin{bmatrix} 0 & 0 & 0 \\ 1 & 0 & 0 \\ 0 & 1 & 0 \\ 0 & 0 & 1 \end{bmatrix} \right\}$$

$$R = 4, P = \{P_1\} = \left\{ \begin{bmatrix} 1 & 0 & 0 & 0 \\ 0 & 1 & 0 & 0 \\ 0 & 0 & 1 & 0 \\ 0 & 0 & 0 & 1 \end{bmatrix} \right\}$$

In this case, instead of the above expression of the W value and the rotation matrix shown in Equation 4, the present invention may transmit signals using only the matrix W composed of the result of the above-mentioned expression, as shown in the following Equation 5.

$$Y = W_{N_t \times R} s^k \quad \text{[Equation 5]}$$

For example, in the case of R=2 and $P = \{P_1, P_2, P_3, P_4, P_5, P_6\}$, the W matrix to be applied to Equation 5 may rotatably use some or all of matrixes from among the set Pm as shown in the following expression.

$$R = 2, \quad \text{[Expression]}$$
$$P = \{P_1, P_2, P_3, P_4, P_5, P_6, P_7, P_8, P_9, P_{10}, P_{11}, P_{12}\} =$$
$$\left\{ \begin{bmatrix} 1 & 0 \\ 0 & 1 \\ 0 & 0 \\ 0 & 0 \end{bmatrix}, \begin{bmatrix} 1 & 0 \\ 0 & 0 \\ 0 & 1 \\ 0 & 0 \end{bmatrix}, \begin{bmatrix} 1 & 0 \\ 0 & 0 \\ 0 & 0 \\ 0 & 1 \end{bmatrix}, \begin{bmatrix} 0 & 0 \\ 1 & 0 \\ 0 & 1 \\ 0 & 0 \end{bmatrix}, \begin{bmatrix} 0 & 0 \\ 1 & 0 \\ 0 & 0 \\ 0 & 1 \end{bmatrix}, \begin{bmatrix} 0 & 1 \\ 1 & 0 \\ 0 & 0 \\ 0 & 0 \end{bmatrix}, \right.$$
$$\left. \begin{bmatrix} 0 & 1 \\ 0 & 0 \\ 1 & 0 \\ 0 & 0 \end{bmatrix}, \begin{bmatrix} 0 & 1 \\ 0 & 0 \\ 0 & 0 \\ 1 & 0 \end{bmatrix}, \begin{bmatrix} 0 & 0 \\ 0 & 1 \\ 1 & 0 \\ 0 & 0 \end{bmatrix}, \begin{bmatrix} 0 & 0 \\ 0 & 1 \\ 0 & 0 \\ 1 & 0 \end{bmatrix}, \begin{bmatrix} 0 & 0 \\ 0 & 0 \\ 0 & 1 \\ 1 & 0 \end{bmatrix} \right\}$$

It can be recognized that the above-mentioned expression is equal to the combination of 6 matrixes $$\left\{ \begin{bmatrix} 1 & 0 \\ 0 & 1 \\ 0 & 0 \\ 0 & 0 \end{bmatrix}, \begin{bmatrix} 1 & 0 \\ 0 & 0 \\ 0 & 1 \\ 0 & 0 \end{bmatrix}, \begin{bmatrix} 1 & 0 \\ 0 & 0 \\ 0 & 0 \\ 0 & 1 \end{bmatrix}, \begin{bmatrix} 0 & 0 \\ 1 & 0 \\ 0 & 1 \\ 0 & 0 \end{bmatrix}, \begin{bmatrix} 0 & 0 \\ 1 & 0 \\ 0 & 0 \\ 0 & 1 \end{bmatrix}, \begin{bmatrix} 0 & 0 \\ 0 & 0 \\ 1 & 0 \\ 0 & 1 \end{bmatrix} \right\}$$

and a first version $$\left( \text{i.e., } \begin{bmatrix} 0 & 1 \\ 1 & 0 \end{bmatrix} \right)$$

of Φ and a second version $$\left( \text{i.e., } \begin{bmatrix} 1 & 0 \\ 0 & 1 \end{bmatrix} \right)$$

of the Φ.

In the meantime, a transmission multiplexing rate (R) may be replaced with a layer considered to be an output dimension of the MIMO encoder. The above-mentioned layer may be equal to or higher than the transmission multiplexing rate (R). Therefore, the dimension R of the 's' value may be different from the transmission multiplexing rate. For example, in the case of using the STC encoding scheme, s may be represented by $$S = \begin{bmatrix} s_1 & -s_2^* \\ s_2 & s_1^* \end{bmatrix}.$$

In this case, the column of the matrix may be indicative of time or frequency resources. In this case, the layer is 2 whereas the transmission multiplexing rate is 1, resulting in the implementation of R=2. As a result, the P value corresponding to R=2 must be used.

According to embodiments of the present invention, different 'l' and 'δ' values can be used according to the transmission multiplexing rate (R) and the distributed permutation or localized permutation method. Further, 'W', Φ, another 'l' value, or another 'δ' value may also be used.

According to embodiments of the present invention, 'k' may be re-defined by 'm'. For example, as previously stated above, the 'm' value may be $$\left\lfloor \frac{k}{l} \right\rfloor \text{ or } \left\lceil \frac{k}{l} \right\rceil$$

in which a single index increases for each 'k' value.

The multiple codeword (MCW) is applied to the antenna encoder 42 to which the codeword permutation (CP) scheme is applied, such that the resultant coded & modulated streams are converted into the space-time code by various MIMO schemes. The MIMO-encoded codeword is applied to the S/P block 43, such that serial data is converted into parallel data. MIMO-processed codewords are OFDM-modulated into others by the OFDM modulation block 44, such that the resultant codewords will be transmitted to the reception end via the multi-antenna 45.

Figure 6:
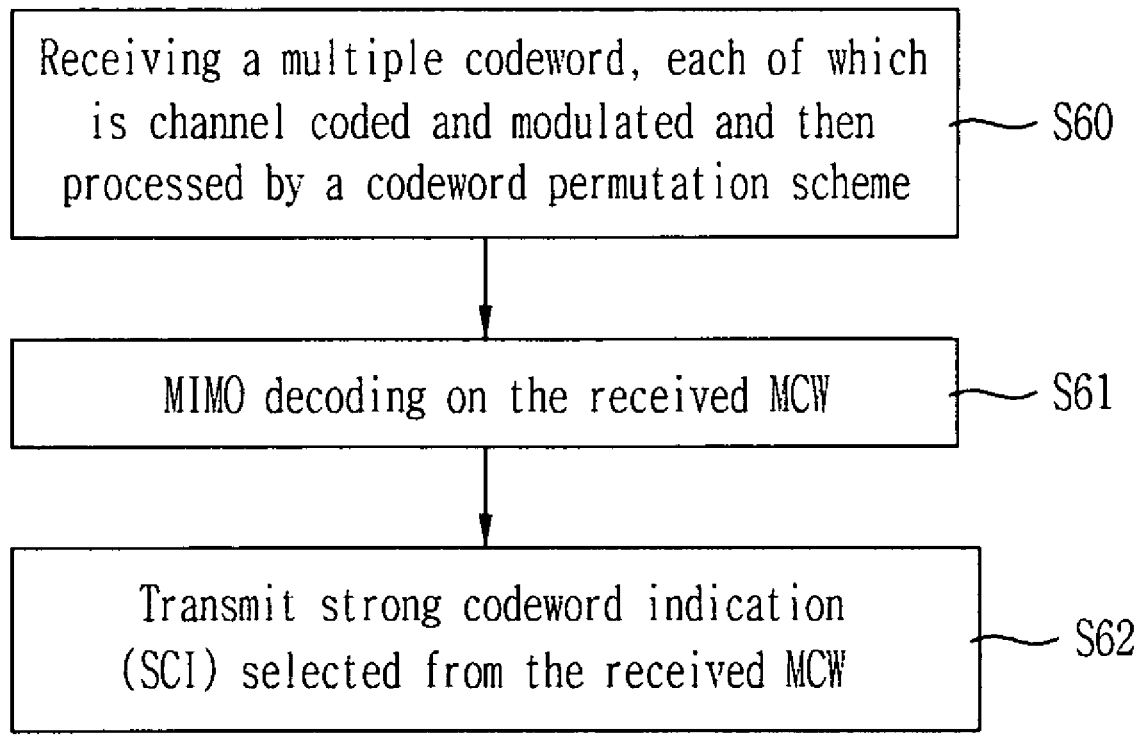
FIG. 6 is a flow chart illustrating a method for receiving a multiple codeword in a MIMO-OFDM system according to the present invention.

FIG. 6 is a flow chart illustrating a method for receiving a multiple codeword in a MIMO-OFDM system according to the present invention.

A reception process of the MIMO-OFDM system is opposite to the above-mentioned transmission process, and a detailed description of the reception process will hereinafter be described.

Firstly, the MIMO-OFDM system acquires MIMO channel information of a corresponding sub-carrier at which data has been received via pilot symbols for channel estimation. Then, the MIMO-OFDM system extracts Tx signals using the Rx-signal vector by various MIMO receivers. Data signal extracted in this way is channel-decoded, is error-corrected, and finally acquires Tx data information. According to the MIMO reception scheme, the above-mentioned processes may be repeated, or may include the additional decoding process.

The reception end, which may be used for this embodiment, may be composed of various receiver types according to transmission-end structures. For example, the MIMO receiver type may be a Minimum Mean Squared Error (MMSE) receiver, a Maximum Likelihood (ML) receiver, or a Minimum Mean Squared Error with Successive Interface Cancellation (MMSE-SIC) receiver, etc.

According to this embodiment of the present invention, the MCW system performs the channel coding and modulation for each codeword, applies the codeword permutation (CP) scheme to the resultant codeword, and receives the CP-processed codeword at step S60. In this case, the present invention may further include a decoding process for the codeword permutation (CP) scheme at step S61. Needless to say, the above decoding process may be modified and performed according to the codeword permutation (CP) scheme.

In the meantime, if the reception end transmits channel quality information as feedback information, each codeword of the MCW system according to the present invention has a channel quality indicator (CQI), such that the present invention applies only columns used for transmitting the high-CQI codeword to the precoding matrix of a low spatial multiplexing rate. However, in the case of using the codeword permutation (CP) scheme, individual codewords are equalized, such that it is impossible for the MIMO-OFDM system to recognize which one of codewords has a good CQI.

Therefore, the present invention additionally provides a method for indicating a codeword having a good CQI. In other words, as shown in step S62, the reception end is able to transmit strong codeword indication (SCI) information having good channel characteristics from among several received codewords (i.e., the received MCW). According to the above-mentioned method for indicating the SCI information, the present invention allocates redundant bits and indicates indexes allocated for each codeword in various ways. This SCI information can be effectively used when the spatial multiplexing rate becomes reduced.

The following embodiments of the present invention will be disclosed on the basis of a data communication relationship between the Node-B and the user equipment (UE). In this case, the Node-B is used as a terminal node of a network via which the Node-B can directly communicate with the user equipment (UE). Specific operations to be conducted by the Node-B in the present invention may also be conducted by an upper node of the Node-B as necessary. In other words, it will be obvious to those skilled in the art that various operations for enabling the Node-B to communicate with the user equipment (UE) in a network composed of several network codes including the Node-B will be conducted by the Node-B or other network nodes other than the Node-B. The term "Node-B" may be replaced with a fixed station, eNode-N (eNB), or an access point as necessary. The user equipment (UE) may also be replaced with a mobile station (MS) or a mobile subscriber station (MSS) as necessary.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention relates to a MIMO communication system, and can be applied to the MIMO communication system capable of transmitting/receiving the multiple codeword (MCW).

According to the inventive transmission/reception method based on the MIMO-OFDM system which uses the multiple codeword, a codeword permutation (CP) scheme may be further performed. The codeword permutation (CP) scheme is further added, such that a variety of MIMO transmission schemes are modified, resulting in the implementation of a high diversity gain. Also, an amount of feedback information is reduced, and a performance of a receiver can be improved. In addition, the present invention is able to make the number of codewords, irrespective of a spatial multiplexing rate or a rank.

The invention claimed is:

1. A method for transmitting signals in a Multiple-Input Multiple-Output (MIMO) communication system, the method comprising:
    performing a channel coding and modulation process for signals to produce coded and modulated streams;
    multiplying a precoding matrix and the coded and modulated streams to produce multiplied streams; and
    transmitting the multiplied streams via a multi-antenna,
    wherein the precoding matrix is represented as a multiplication of a first matrix and a second matrix,
    wherein at least the first matrix or the second matrix is selected in a rotation based on $$\left\lfloor \frac{k}{l} \right\rfloor$$

from among 'N' matrixes,
    wherein 'k' corresponds to a resource index for the coded and modulated streams and 'l' corresponds a predetermined number greater than 1, and
    wherein 'N' increases according to a rank (R).

2. The method of claim 1, wherein the first matrix has a nested property.

3. The method of claim 1, wherein l corresponds to R.

4. The method of claim 1, wherein the second matrix is represented by a multiplication of a phase-shift diagonal matrix (D) and a unitary matrix (U).

5. The method of claim 4, wherein D is based on R as:

| Rank, R | Phase-shift diagonal matrix D(k) |
|---|---|
| 2 | $\begin{bmatrix} 1 & 0 \\ 0 & e^{-j2\pi k/2} \end{bmatrix}$ |
| 3 | $\begin{bmatrix} 1 & 0 & 0 \\ 0 & e^{-j2\pi k/3} & 0 \\ 0 & 0 & e^{-j4\pi k/3} \end{bmatrix}$ |
| 4 | $\begin{bmatrix} 1 & 0 & 0 & 0 \\ 0 & e^{-j2\pi k/4} & 0 & 0 \\ 0 & 0 & e^{-j4\pi k/4} & 0 \\ 0 & 0 & 0 & e^{-j6\pi k/4} \end{bmatrix}.$ |

6. The method of claim 4, wherein U is based on R as:

| Rank, R | Unitary matrix, U |
|---|---|
| 2 | $\begin{bmatrix} 1 & 1 \\ 1 & e^{-j2\pi/2} \end{bmatrix}$ |
| 3 | $\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ |
| 4 | $\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}.$ |

7. A method for receiving signals in a Multiple-Input Multiple-Output (MIMO) communication system, the method comprising:
    receiving multiple streams, each of the multiple streams being channel coded and modulated and then multiplied by a precoding matrix at a transmitting end; and
    performing reverse processes of the multiplying by the precoding matrix, the modulation, and the channel coding,
    wherein the reverse processes comprise performing a MIMO decoding on the received multiple streams based on the precoding matrix,
    wherein the precoding matrix is represented as a multiplication of a first matrix and a second matrix,
    wherein at least the first matrix or the second matrix is selected in a rotation based on $$\left\lfloor \frac{k}{l} \right\rfloor$$

from among 'N' matrixes,
    wherein 'k' corresponds to a resource index for streams and 'l' corresponds a predetermined number greater than 1, and
    wherein 'N' increases according to a rank (R).

8. The method of claim 7, wherein the first matrix has a nested property.

9. The method of claim 7, wherein l corresponds to R.

10. The method of claim 7, wherein the second matrix is represented by a multiplication of a phase-shift diagonal matrix (D) and a unitary matrix (U).

11. The method of claim 10, wherein D is based on R as:

| Rank R | Phase-shift diagonal matrix D(k) |
|---|---|
| 2 | $\begin{bmatrix} 1 & 0 \\ 0 & e^{-j2\pi k/2} \end{bmatrix}$ |
| 3 | $\begin{bmatrix} 1 & 0 & 0 \\ 0 & e^{-j2\pi k/3} & 0 \\ 0 & 0 & e^{-j4\pi k/3} \end{bmatrix}$ |

-continued

| Rank R | Phase-shift diagonal matrix D(k) |
|---|---|
| 4 | $\begin{bmatrix} 1 & 0 & 0 & 0 \\ 0 & e^{-j2\pi k/4} & 0 & 0 \\ 0 & 0 & e^{-j4\pi k/4} & 0 \\ 0 & 0 & 0 & e^{-j6\pi k/4} \end{bmatrix}$. |

12. The method of claim 10, wherein U is based on R as:

| Rank, R | Unitary matrix, U |
|---|---|
| 2 | $\begin{bmatrix} 1 & 1 \\ 1 & e^{-j2\pi/2} \end{bmatrix}$ |
| 3 | $\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ |
| 4 | $\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$. |

* * * * *